Patented Oct. 25, 1932

1,884,407

UNITED STATES PATENT OFFICE

ELDON VAN ROMAINE, OF CINCINNATI, OHIO, HENRY J. WEILAND, OF SOUTH MILWAUKEE, WISCONSIN, AND PAUL O. POWERS AND ROBERT C. PALMER, OF PENSACOLA, FLORIDA, ASSIGNORS, BY MESNE ASSIGNMENTS, TO NEWPORT INDUSTRIES, INC., A CORPORATION OF DELAWARE

PROCESS OF LIMING ROSIN

No Drawing.   Application filed October 28, 1929.   Serial No. 403,115.

This invention relates to a process of liming rosin and more particularly it relates to a method of liming purified wood or gum rosin under such conditions as to carry the neutralization by lime to the same extent as in the case of natural gum rosin or regular (crude) wood rosin. It further relates to the treatment of purified wood or gum rosin so as to make the rosin susceptible to efficient liming and to the rosin products obtained.

As is well known, one of the chief uses of rosin is in making varnishes and gloss oils. It is essential for this use to first partially neutralize the acidity of the rosin by means of lime. The methods heretofore used consisted of heating a suitable quantity of either gum or wood rosin to about 200 to 210° C., at which temperature the mass is in molten state, and adding slaked lime in a proportion varying in the art from 2 to 8% by weight of the rosin used. The more common practice is to add about 6%. The entire mass is then stirred, further heated to about 285° C., and held at this temperature for a short time. Another method recently suggested is to dissolve the rosin in a solvent such as toluene, kerosene, asphaltum-base oil, or the like, and heat the solution to about 120° C. whereupon the lime is added in the form of a paste made up from slaked lime and the particular organic solvent chosen for the rosin.

In either of the above methods and in the case of natural gum rosin or the darker grades of wood rosin (grade "FF regular"), saponification takes place readily, consuming as high as about 90% of the lime used.

However, in the case of bleached wood or gum rosin, for instance grades I to N, or WG to X, the saponification does not proceed very far, and at the end of the treatment, in some cases, only about ⅓ of the lime used has been combined. As the product is to be used in varnishes or gloss oils, which go to cover the surfaces of various wood or metal objects, it is eccential taht it contain as little coloring material as possible. For this reason the saponification by lime of pale or bleached rosin is considerably more important than the saponification of crude or unbleached grades. In the liming of crude or unbleached rosin, the coloring matter in the rosin remains practically unchanged and subsequently imparts dark colors to the varnish or gloss oil produced from it. The fact that pale rosin can not be satisfactorily limed is therefore quite a handicap in the varnish industry.

It is therefore an object of this invention to provide a process for efficiently liming rosin and more particularly bleached or purified wood or gum rosin.

Other and further important objects of this invention will become apparent from the disclosures in the following description and appended claims.

We have found that when certain chemical substances (elements or compounds) are added in small quantities to rosin, and especially to purified or bleached gum rosin or to pale wood rosin, either prior to or during the addition of lime in the liming operation, such substances apparently catalyze the reaction, with the result that the lime is consumed practically 100%. It will be understood, of course, that we are referring here to liming treatments as practiced in the art, wherein the quantity of lime added is always less than the quantity required theoretically for complete neutralization of the rosin. More specifically, we deal here with treatments wherein the quantity of lime used in the form of calcium hydroxide amounts in weight to from 2 to 8% of the weight of the rosin used, and to about 6% in the preferred process. In all such cases the addition of a substance of the class described below, and hereinafter referred to as "catalysts", was found to increase the "efficiency of the liming", the latter term signifying the percentage of the original quantity of lime used which has entered into reaction.

The class of substances which will act as "catalysts" in the above referred to reaction is very large and rather hard to define precisely. However, we find that in general the substances belonging to this class possess the following properties: (1) They are soluble in rosin at the temperature of the liming operation. (2) They are either acids or substances capable of reacting with abietic acid to liberate an acid, or substances capable of hydrolyzing, dissociating or decomposing to yield an acid. (3) The acid thus formed in the rosin is capable of reacting with lime to give a calcium compound soluble in rosin. While this definition is rather cumbersome, its scope is well defined as will be further evident by studying the lists of effective catalysts submitted below:

Group I

Hydrochloric acid
Acetic acid
Monochlor-acetic acid
Formic acid
Oxalic acid
Lactic acid
Tartaric acid
Citric acid
Stearic acid
Benzoic acid
Phthalic acid
Salicylic acid
Phenol

Group II

Magnesium chloride
Zinc chloride
Stannic chloride
Ferric chloride
Copper chloride
Calcium chloride
Aluminum chloride
Sodium acetate
Sodium formate
Sodium oxalate
Calcium acetate
Magnesium acetate
Potassium acetate
Ammonium acetate
Copper acetate
Cobalt acetate
Manganese acetate
Sodium benzoate
Sodium salicylate
Sodium phthalate
Potassium acid sulfate

Group III

Iodine
Ethyl phthalate
Phthalic anhydride
Benzoyl chloride
Acetamide

In this list it will be noted that Group I comprises various acids or acid reacting substances which are capable of reacting with $Ca(OH)_2$. Experiment further reveals that the salts thus formed are soluble in molten rosin. It will be noted that this group comprises inorganic acids, as well as organic acids; and in the latter group, compounds whose acidity is due to a carboxylic acid radical as well as such whose acidity is of a phenolic nature. Group II comprises salts of the acids generally contained in Group I, such salts being capable of reaction with abietic acid to give a metal abietate and an acid of the type falling within Group I, said acid being capable of reacting with lime to give a calcium salt soluble in molten rosin. Group III comprises iodine as well as organic derivatives of carboxylic acids (esters, anhydrides, chlorides, and amides) which are capable of decomposing in the melt yielding an acid residue falling within the range of Group I. Thus, iodine reacts with abietic acid to halogenate the same, and at the same time liberate hydriodic acid.

The majority of the substances enumerated above include in their structural formulæ the grouping —COOM, where M is hydrogen, a metal or the ammonium radical. These substances containing the carboxylic acid radical have been found to be very satisfactory for the purpose and are particularly feasible for commercial use.

The following additional substances have been found to have a moderate catalytic effect on the liming process. By this is meant that while these substances push the lime consumption further than would be the case were these substances not used, the efficiency of liming is not so great as when using a substance selected from the first table.

Group IV

Strong or weak sulfuric acid
Phenol sulfonic acid
Naphthalene sulfonic acid

Group V

Sodium acid sulfite
Copper sulfate
Zinc sulfate
Disodium phosphate

It will be noted that the substances of Groups IV and V will react with lime to give calcium salts which are more difficultly soluble in molten rosin than the calcium salts of the acids of Group I.

The amount of catalyst added to the rosin need not be very great. Excellent results, as far as increasing the efficiency of liming is concerned, may be obtained by adding as little catalyst as 0.02% by weight of the rosin being treated. On the other hand, the use of larger quantities, say 0.1% or even higher does no harm except waste of the catalytic substance. In most of our tests we used an amount of catalyst equal to 0.05% by weight of the rosin being treated.

The addition of the catalyst to the rosin may be made either before, or concurrently with, or after the addition of lime. Alternatively, the catalyst may be incorporated in the rosin in the process of bleaching or refining of the latter, and the rosin may then be stored or shipped to be treated with lime at a subsequent date.

There is one precaution to be observed in the process of preparing the rosin-catalyst composition above mentioned as distinguished from the process of preparing limed pale rosin in one step. The catalyst in the preferred method is added to the rosin while the latter is in a molten condition, and therefore when the temperature of the rosin is about 200° C. or over. Some of the catalysts above enumerated decompose more or less rapidly at this high temperature to yield, not an acid or acid radical, but various destructive decomposition products. For instance, oxalic acid decomposes into $H_2O$, $CO_2$ and $CO$. If the catalyst is added during the liming process, its catalytic effect on the reaction may be exerted long before it is completely decomposed. The result is that the bleached rosin is saponified with a high efficiency. If, however, the lime is not added soon, as in the case where bleached wood or gum rosin is merely pretreated with a catalyst to render it susceptible to liming in the future, the catalyst may decompose completely before the rosin is cooled. It is therefore essential in the latter case to choose a catalyst of greater stability, at the temperature of molten rosin, than in the case where the catalytic treatment and liming occur practically simultaneously. It may be noted in this connection, that even in the case of concurrent liming and catalytic treatment, the catalyst must not be so unstable as to escape before the proper liming temperature. Thus, ethyl acetate is not effective for our purpose when employed in the high temperature liming operation for the reason that it is so volatile that it escapes long before the liming temperature is reached. On the other hand, hydrochloric acid, although highly volatile, dissolves to some extent in rosin, by virtue of which a sufficient amount of it is retained in the rosin, even at temperatures above 200° C. to promote the efficiency of saponification.

The following specific examples will further serve to illustrate preferred embodiments of the invention. The parts are by weight.

*Example 1*

100 parts of purified wood or gum rosin are heated in a suitable container to about 150 to 175° C., at which temperature the rosin is all in a molten state. About 0.04 to 0.1 part of acetic acid is added, provision being made by stirring or mixing for its uniform distribution. About 6 parts of powdered slaked lime are now sifted in, the heating being continued to about 285° C., and the mass held at that temperature for about 10 minutes. The mass is then cooled to about 150° C. and a suitable vehicle is added to form a varnish or gloss oil. If desired, the addition of the vehicle may be omitted, and the rosin withdrawn and stored for future use.

*Example 2*

100 parts of freshly broken bleached wood rosin are heated in a suitable container with about 140 parts of toluene until solution is complete. About 0.04 to 0.1 parts of acetic acid are now added, and the solution is stirred to distribute the acetic acid uniformly. A suspension of 5 parts of slaked lime in about 90 parts of toluene is now added. The entire mass is then again heated under a reflux condenser to about 110° C. for about 10 minutes and cooled. The resulting liquid may be used directly as a gloss oil.

Instead of toluene in this example, other solvents may be used; for instance, asphaltum-base oil, petroleum naphtha or kerosene.

*Example 3*

100 parts of purified wood or gum rosin are heated in a suitable container to about 150 to 175° C. at which temperature it is all molten. About 0.04 to 0.1 part of acetic acid is added, provision being made by stirring or mixing for its uniform distribution. This activated rosin is then cooled to 150° and poured into suitable containers and allowed to solidify.

*Example 4*

100 parts of purified wood or gum rosin to which about 0.04 to 0.1 part of acetic acid has previously been added (Example 3) are heated to about 215° C. and about 6 parts of powdered slaked lime are sifted in. The heating is continued to 250° C. and held at that temperature for about 30 minutes. The mass is then cooled and a suitable vehicle added to form a varnish or gloss oil. If desired, the addition of a vehicle may be omitted and the limed rosin withdrawn and stored for further use.

*Example 5*

100 parts of purified wood or gum rosin are heated to about 215° C. when it is all molten. About 1 part of powdered slaked lime is added. If no water is evolved, about 0.02 to 0.1 part of acetic acid may be added to start the reaction. Then 5 parts of powdered slaked lime are sifted in at 215° C. The heating is then continued to 285° and held at that temperature ten minutes. The mass is then cooled to 150° and a suitable vehicle added or the limed rosin may be withdrawn and stored.

*Example 6*

The procedure is the same as in Example 1, except that instead of acetic acid, sodium acetate, or any other alkali metal acetate, alkaline earth metal acetate, or any metallic acetate may be used. The results are substantially the same.

*Example 7*

The procedure is the same as in Example 1, except that instead of acetic acid, lactic acid, tartaric acid, citric acid, or any other hydroxy-acid may be used. The results are substantially the same.

*Example 8*

100 parts of rosin are heated in a suitable container to about 215° at which temperature the rosin is all in a molten state. About 0.05 part of calcium chloride is added, and about 6 parts of powdered slaked lime are sifted in. The heating is continued to about 250° to 270° for a period of ten to thirty minutes. The mass is then cooled to 150° and a suitable vehicle is added to form a varnish or gloss oil. If desired the addition of the vehicle may be omitted, and the limed rosin withdrawn and stored for future use.

Example 9

The procedure is the same as in Example 2, except that acetic acid is replaced by lactic acid. The results are substantially the same.

Example 10

The procedure is the same as in Example 2, except that acetic acid is replaced by sodium acetate, or any other alkali metal acetate, alkaline earth metal acetate or any metallic acetate. The results are substantially the same.

Example 11

The procedure is the same as in Example 2, except that instead of acetic acid, a metallic chloride, for instance calcium chloride, is used. The results are substantially the same.

The effect of the addition of the catalyst in each of the above examples may be studied through determination of the acid number of the final product. If the acid number of a bleached rosin limed according to our process be compared with that of the same sample of rosin limed without the addition of a catalyst, it will be found that the former has a considerably lower acid value than the latter.

Where the term "purified" wood or gum rosin is used in the claims, it will be understood that any wood or gum rosin from which coloring matters have been removed, as by bleaching or other special treatment, is meant.

We are aware that numerous details of the process may be varied through a wide range without departing from the principles of this invention, and we therefore, do not purpose limiting the patent granted hereon, otherwise than necessitated by the prior art.

We claim as our invention:

1. In the process of liming a purified wood or gum rosin, the step of incorporating in the rosin small amounts of a catalyst selected from a group of substances characterized by their solubility in rosin at the temperature employed for liming, their acidic nature or their tendency to form acid reacting residues upon dissociation or hydrolysis, said acid reacting residues being capable of forming calcium compounds that are soluble in rosin.

2. In the process of saponifying decolorized wood or gum rosin by means of lime, the step of incorporating in the rosin small amounts of a catalyst capable of increasing the efficiency of the liming, said catalyst being selected from a group consisting of organic carboxylic acids, their salts, esters, anhydrides, halides and amides.

3. In the process of saponifying bleached wood or gum rosin by means of lime, the step of incorporating in the rosin small amounts of a catalyst capable of increasing the efficiency of the liming, said catalyst being selected from a group consisting of halogens, halogen acids, and halogen salts.

4. In the process of saponifying bleached wood or gum rosin by means of lime, the step of incorporating in the rosin from about .02 to 0.1% of an aliphatic hydroxy-carboxylic acid to promote the efficiency of the liming.

5. In the process of liming a purified wood or gum rosin, the step of incorporating in the rosin from 0.02 to 0.1% of a catalyst selected from a group of substances characterized by their solubility in rosin at the temperature employed for liming, their acidic nature or their tendency to form acid reacting residues upon dissociation or hydrolysis, said acid reacting residues being capable of forming calcium compounds that are soluble in rosin.

6. As a new article of manufacture, purified rosin containing from about .02 to 0.1% of a catalyst capable of increasing the efficiency of liming the rosin and selected from a group of substances characterized by their solubility in rosin at the temperature employed for liming, their acidic nature, or their tendency to form acid reacting residues upon dissociation or hydrolysis.

7. In the process of liming a purified wood or gum rosin, the step of incorporating in the rosin small amounts of a catalyst selected from a group consisting of acetic acid and acetates to promote the efficiency of the liming operation.

8. In the process of saponifying bleached wood or gum rosin by means of lime, the step of incorporating in the rosin small amounts of calcium acetate as a catalyst to increase the efficiency of the liming.

9. As a new article of manufacture, purified rosin containing from about .02 to 0.1% of a catalyst capable of increasing the efficiency of the liming of rosin selected from the group consisting of acetic acid and acetates.

10. As a new article of manufacture, purified rosin containing from about .02 to 0.1% of calcium acetate as a catalyst to increase the efficiency of liming the rosin.

In testimony whereof we have hereunto subscribed our names.

ELDON VAN ROMAINE.
HENRY J. WEILAND.
PAUL O. POWERS.
ROBERT C. PALMER.